Patented Mar. 8, 1949

2,464,043

UNITED STATES PATENT OFFICE 2,464,043

AIR-DEODORIZING COMPOSITIONS

Jonas Kamlet, New York, N. Y., assignor to Boyle-Midway Inc., New York, N. Y., a corporation of Delaware No Drawing. Application July 21, 1945,
Serial No. 606,471

10 Claims. (Cl. 167—26)

1

This invention relates to air-deodorizing compositions suitable for the treatment of air in confined spaces to remove or obviate noisome and objectionable odors. It relates further to compositions adapted for use in the household, in hospitals and physicians' offices, in factories and industrial plants, in public buildings and lavatories, etc., for the elimination of undesirable odors.

One object of this invention is to provide improved compositions of matter which will cause an efficient deodorization of air in confined spaces by the constant liberation of a highly reactive compound in vapor form capable of interaction with the chemical agents responsible for the bad odors, whereby said agents are inactivated and deodorized or rendered less objectionable. Another object of this invention is to provide said improved compositions of matter in solid form, thus obviating the drawbacks of the liquid preparations heretofore used for that purpose. Another object of this invention is to eliminate the necessity of human intervention or mechanical manipulation to render the deodorizing compositions effective, i. e., to provide compositions which do not have to be sprayed, vaporized, aspirated, ejected, sublimed by heating, etc. Another object of this invention is to provide solid deodorizing compositions which may be used in conjunction with air conditioning systems to deodorize recirculated air and remove the "stale" or vitiated character thereof. Other and additional objects of this invention will become obvious to those skilled in the art from the following disclosure.

Numerous procedures for the deodorization of air have been described heretofore. Thus, U. S. Patents 1,681,531 of 1928; 1,941,921 of 1929; 1,957,385 of 1934; 1,999,499 of 1935; 2,214,737 of 1941; German Patent 703,976 of 1941; Canadian Patent 401,098 of 1941 and others are based on the adsorption of noisome gases or vapors on finely divided activated adsorbents such as silica gel, alumina or carbon. Other deodorant compositions, such as those described in British Patent 258,110 of 1925, British Patent 484,854 of 1938, German Patent 535,677 of 1925, U. S. Patent 2,071,094 of 1937, and by Joseph in Ice and Cold Storage 41, No. 482, 77-8 (1938) depend on the destruction of unpleasant odors by oxidation with potassium permanganate, hypochlorous acid, ozone, hydrogen peroxide, etc. The use of alkaline compounds in deodorizing compositions to react with malodorous compounds of an acidic nature is described in U. S. Patents 1,702,168 of 1929; 1,957,385 of 1934, and elsewhere. Other

2 procedures involve the use of air filters containing water, alcohol, glycerine, soaps, mineral oil or other compounds to scrub noisome compounds from the circulating air of air conditioning systems (e. g., German Patent 549,505 of 1930; U. S. Patent 2,347,031 of 1944; Mortara and Brunner, National Engineer, 42, 332-3 (1938)); electrostatic precipitation of malodorous dusts and antiseptic agents is also disclosed.

Since microorganisms and organic putrefaction are often the cause of foul odors, it has long been common practice to deodorize confined spaces by the action of powerful antiseptics such as formaldehyde, chlorine, sulfur dioxide, phenol, in liquid or vapor form, etc. However, these methods are quite unsuitable for use in the household and in many public buildings. Concentrations of these chemical agents in the air sufficiently high to be effective as germicides and fungicides are usually intolerable to humans. These antiseptics are themselves possessed of powerful and disagreeable odors and their continual presence in the air in sufficient amounts to impart lasting bactericidal properties thereto is completely unfeasible. In addition, many objectionable odors may be of entirely non-organic origin.

A highly effective agent for the deodorization of foul air is formaldehyde, especially as the vapor of the monomer. An important distinction must be made between the use of formaldehyde vapor as a disinfectant and as a deodorant. While high concentrations of formaldehyde gas in the air will efficiently sterilize and deodorize confined spaces, it is quite impossible to breathe air containing this compound in sterilizing concentrations; the odor is pungent and the vapor will cause intense irritation of the mucosa of the eyes and nose. However, concentrations of formaldehyde vapor below the odor threshold (i. e., too low to be detected by the average human sense of smell) and far too low to impart bacteriostatic or fungistatic properties to the air, will nevertheless deodorize and freshen the air quite efficiently. Many chemical compounds become noticeably malodorous when present in the air in infinitesimal concentrations, and it is rarely necessary to use formaldehyde vapor in high equivalent concentrations to react with, inactivate and deodorize these objectionable compounds.

Monomeric formaldehyde, especially in the vapor state, is an extremely active chemical reagent. With ammonia, a common product of organic putrefaction, it forms odorless hexamethylenetetramine. With primary and secondary aliphatic amines it forms methyleneimines, methylenediamines, N-methyl and N,N-dimethyl-amines and high molecular weight polymers. With aromatic amines it forms Schiff bases and odorless long chain polymers. With alcohols and mercaptans, it yields formals and thioformals. With hydrogen sulfide it yields trithioformaldehyde and high molecular weight sulfur compounds. Few chemical compounds possessing objectionable odors do not contain groupings capable of reacting with formaldehyde in the vapor state to form derivatives of higher molecular weight, lower volatility or vapor pressure and less objectionable odor. Formaldehyde is also a powerful reducing agent and, under some conditions, an excellent oxidizing agent, thus permitting it to assume some of the functions of the latter group of chemical deodorizing agents. One or more of these modes of action may explain the deodorizing activity of formaldehyde vapor in minimal concentrations in the air against any specific compound of objectionable odor. However, it is not desired that this invention be limited in any way by the aforementioned explanation. Numerous other aspects of the chemical, physical, biological and physiological effects of formaldehyde have been advanced in attempts to explain its activity as a deodorizing agent of air in concentrations below the odor threshold and below that required for bacteriostasis or fungistasis.

Heretofore, most of the preparations employing formaldehyde in the deodorization of air have been liquids. Thus for example White (British Patent 450,717 of 1936; U. S. Patent 2,077,060 of 1937) uses formaldehyde in an aqueous solution of sodium metasilicate, Paschal (U. S. Patent 2,326,672 of 1943) employs an aqueous solution of formaldehyde containing chlorophyll. These liquid preparations become attenuated by loss of formaldehyde from the solution and by polymerization on standing. They must be sprayed, vaporized or aspirated into the air, or else they must depend on the slow and relatively inefficient capillarity of a cotton or felt wick to be disseminated into the surrounding space. When spilled accidentally, these solutions may contaminate food products, decolorize dyed textiles and painted wooden surfaces and otherwise spoil or harm valuable materials coming into contact with them.

Paraformaldehyde, the solid linear polymer of formaldehyde, has been compressed in tablet form for use in sterilizing and disinfecting compositions. Thus, a tabletted mixture of paraformaldehyde, sodium bicarbonate and barium peroxide which evolves formaldehyde vapor when treated with water has been used for this purpose (R. P. Crandall, U. S. Naval Med. Bull., 11, 519 (1917)). However, this composition evolves its formaldehyde content quite rapidly, builds up a formaldehyde concentration in the air far above the odor threshold—sufficient, in fact, to inhibit bacterial and other microorganic proliferation— and must then be renewed. Solid compressed blocks of paraformaldehyde possess a relatively small total surface per unit weight and thus sublime far too slowly to cause an efficient deodorization unless heated by some means, a procedure which is usually impractical. Powdered paraformaldehyde has a tendency to pack in the container and thus offers little advantage over the compressed tablet or block.

The deodorizing compositions of the present invention comprise the combination of (a) paraformaldehyde and (b) symtrioxane, with preferably (c) a depolymerization catalyst and, optionally, (d) a perfuming or reodorizing agent chemically inert to formaldehyde, in the proper proportions and in the solid state.

Paraformaldehyde, one of the solid polymers of formaldehyde, is a white, crystalline powder with a strong formaldehyde odor, which sublimes with decomposition to the monomer at 150°–160° C. It is prepared by the evaporation of aqueous formaldehyde solutions or by the rapid cooling of formaldehyde-containing gases (U. S. Patent 1,666,708 of 1928, French Patent 617,032 of 1926, British Patent 260,908 of 1926). Hofmann (Annalen, 145, 357 (1868)) wrongly assumed this polymer to be the trimer, so that paraformaldehyde is often misnamed "trioxymethylene." Actually it is a mixture of high molecular weight linear polymers of the general formula $$HO(CH_2O)_nH$$

in which $n$ is an integer from 10 to 100. Paraformaldehyde usually reacts as does monomeric formaldehyde. Because of this great reactivity, few compounds are known which are suitable for use as plasticizers or solvents of paraformaldehyde without decomposition or reaction with the polymer.

I have found that symmetrical-trioxane is an ideal plasticizer and solvent for paraformaldehyde. Trioxane is the cyclic ether trimer of formaldehyde, whose structural formula is:

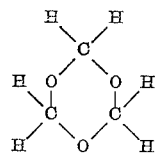

The physical and chemical properties of this polymer are completely different from those of paraformaldehyde. It is a single chemical compound rather than a mixture of polymers, forming colorless crystals melting at 61°–62° C. and boiling without decomposition at 115° C. The odor of trioxane is pleasant, reminiscent of chloroform or carbon tetrachloride; the pungent odor of formaldehyde is completely absent. Trioxane has a high vapor pressure at normal temperatures and sublimes quite readily. In the absence of a depolymerization catalyst, the vapor consists of the cyclic trimer, rather than the monomer as in the case of paraformaldehyde.

Sym-trioxane was discovered by Pratesi (Gazz. chim. ital., 14, 139 (1885)) who obtained it by heating paraformaldehyde in a sealed tube in the presence of sulfuric acid at 115° C. This procedure was modified and improved by Seyewitz and Gibello (Comptes rendus, 138, 1225 (1904)), by Auerbach and Barschall (Die festen Polymeren des Formaldehyde, Julius Springer, Berlin, 1907, pages 38–45) and by Hammick and Boeree (Journ. Chem. Soc. London, 121, 2738–40 (1922)). An improved procedure for the preparation of trioxane has been patented by Frank (U. S. Patent 2,304,080 of 1942). A concentrated aqueous formaldehyde solution may be distilled in the presence of an acid catalyst and the trioxane formed may be extracted from the distillate with a water-immiscible solvent such as methylene chloride.

Molten trioxane at a temperature below the decomposition point of paraformaldehyde will plasticize and, in higher relative concentrations, dissolve paraformaldehyde without decomposition of the latter. On cooling below the melting point of the mixture, a solid composition is obtained. The use of trioxane as a plasticizer and solvent of paraformaldehyde effects a number of desirable results:

1. The compositions, while molten, may be poured into bottles, cans, boxes, hollow ornamental objects, forms, etc. On cooling, solid para-formaldehyde-containing compositions are obtained without the necessity of tabletting or compression.

2. The trioxane sublimes much more rapidly than does the paraformaldehyde, leaving behind a spongy mass of paraformaldehyde. This mass exposes a large total surface and, since the sublimation of the paraformaldehyde is a function of the total surface exposed, a much more efficient diffusion of formaldehyde vapor into the surrounding air is obtained.

3. In the presence of traces of acid, (e. g., the depolymerization catalyst) paraformaldehyde may depolymerize partly to trioxane, thus diminishing its capacity to liberate formaldehyde. The presence of preformed trioxane largely or totally suppresses this tendency, owing to the well known mass action law.

4. The pleasant odor of trioxane masks the pungent odor of paraformaldehyde almost completely (especially at higher concentrations of the former) even without the assistance of a perfuming or reodorizing agent.

5. The paraformaldehyde-trioxane compositions, preferably in the presence of a depolymerization catalyst, constantly liberate formaldehyde vapor into the air at normal room temperatures. No spraying or vaporizing equipment is necessary. The formaldehyde concentration in the air is below the odor threshold but serves quite adequately to inactivate, neutralize or otherwise obviate undesirable odors. The compositions are stable indefinitely when stored in covered containers. Removing the cover to permit the sublimation of the trioxane to commence is all that is necessary to activate the deodorizing preparations. These compositions are also quite economical since small quantities will continue functioning for considerable periods of time.

The ratio of paraformaldehyde to trioxane may vary considerably in the deodorizing compositions of my invention. Thus, from 10% to 90% of the mixture may be paraformaldehyde, and the remainder trioxane. Low relative concentrations of trioxane serve merely to plasticize the paraformaldehyde; high concentrations yield free flowing suspensions or solutions of the mixture.

The preferred depolymerization catalysts of my invention are chosen from the group comprising the strong inorganic acids such as hydrochloric, sulfuric and phosphoric, and the acid-reacting salts such as zinc chloride, calcium chloride, monobasic sodium phosphate, and potassium bisulfate. These catalysts aid the depolymerization of the paraformaldehyde to monomeric formaldehyde vapor. They also catalyse the partial depolymerization of the trioxane to monomeric formaldehyde vapor. In the absence of these compounds, trioxane sublimes in an unchanged state of aggregation; in the presence of a suitable depolymerization catalyst, it adds its quota of formaldehyde vapor to the total amount evolved. When produced in this manner, formaldehyde is extremely active and enters readily into chemical reaction with any compound capable of chemical combination, e. g., the malodorous substances.

The depolymerization catalysts are preferably used in concentrations varying from 0.1% to 10.0% of the total weight of the compositions. Higher concentrations of less acid compounds have the same catalytic effect as lower concentrations of more acid compounds. By choosing the proper catalyst and concentration, the rate of depolymerization can be controlled. However, the concentration of catalysts in these compositions is not to be considered critical. Liberation of formaldehyde by paraformaldehyde occurs even in the absence of an added depolymerization catalyst. This is probably due to the action of the formic acid, one of the strongest organic acids, formed by air-oxidation of formaldehyde or paraformaldehyde, or by a Cannizzaro type of reaction.

The deodorizing compositions of the present invention may also contain, optionally, a perfuming or reodorizing agent. Such an agent must, of course, be chemically inert to formaldehyde. It must be devoid of any chemical grouping capable of reaction with formaldehyde, whereby the "trueness" of the perfume and its function as a reodorizing agent would be destroyed or might even be rendered offensive. Esters of saturated alcohols with saturated acids, essential oils consisting predominantly of such esters, certain terpenes, ethers of low reactivity, etc., are examples of suitable perfuming or reodorizing substances. Great care should be exercised in the choice of these agents. One advantage of the use of trioxane is that it is an excellent solvent for most organic compounds and dissolves such aromatic oils quite readily.

Often, it may be desirable to accelerate the rate of sublimation of the air-deodorizing compositions of my invention. This may be effected by adding thereto any desired amount of a readily subliming compound or substance compatible with trioxane and paraformaldehyde, such as para-dichlorbenzene, naphthalene, camphor, menthol, trimethylcyclohexanol, etc. Such an addition serves to diminish the relative concentration of the paraformaldehyde-trioxane couple, but because of the greater volatility of the added diluent, the composition will be dissipated in a shorter period of time. As before, the deodorizing activity of these compositions will reside primarily in their ability to liberate monomeric formaldehyde vapor. The added diluent may also assist as a perfuming or reodorizing agent.

The following examples are given to illustrate the present invention, but in no way to limit it as to the reagents, proportions or conditions described. Obvious modifications will occur to one skilled in the art.

*Example I*

One hundred seventeen and one half pounds of trioxane are heated to 70–75 C. and 352.5 pounds of paraformaldehyde are gradually kneaded into the melt. Five pounds of 10% (7° Bé.) hydrochloric acid and 25 pounds of a suitable perfuming agent are then added. The kneading is continued at 70°–75° C. When a uniform product is obtained, it is packed into metal or glass containers, or suitable hollow decorative porcelain or plastic ware, and permitted to cool to a solid mass. The surface of the composition must be kept covered until it is to be used. On exposure of the surface sublimation of the trioxane and evolution of formaldehyde vapor commences.

*Example II*

Two hundred thirty five pounds of trioxane are heated to 75°–80° C. and 235 pounds of powdered paraformaldehyde are gradually stirred into the melt. Five pounds of zinc chloride dissolved in five pounds of water are now added, followed by 20 pounds of a suitable perfuming agent.

Mixing is continued at 70°–75° C. until a homogeneous reaction mixture is obtained. It is then poured into its ultimate receptacles, covered and allowed to cool to a solid mass. On uncovering the surface these deodorizing compositions are activated.

*Example III*

One hundred seventeen and a half pounds of trioxane and 235 pounds of para-dichlorbenzene are heated together to 75°–80° C. until a uniform melt is obtained, and 117.5 pounds of powdered paraformaldehyde are gradually stirred into the melt. Ten pounds of a 50% aqueous solution of phosphoric acid are now added, followed by 20 pounds of pine oil. Mixing is continued at 70°–75° C. until a homogeneous mixture is obtained. It is then poured into its ultimate receptacles and allowed to cool to a solid mass.

*Example IV*

One hundred fifty pounds of trioxane and 225 pounds of camphor are heated together to 75°–80° C. until completely dissolved, and 100 pounds of powdered paraformaldehyde are gradually stirred into the melt. Five pounds of anhydrous zinc chloride dissolved in 5 pounds of water are now added, followed by 15 pounds of a light floral bouquet. The mixture is stirred until homogeneous, then poured into its ultimate receptacles and allowed to cool to a solid mass.

I claim:

1. An air-deodorizing composition in the form of a solid form-stable mass containing a formaldehyde-polymer depolymerizing catalyst selected from the group consisting of inorganic acids and acid-reacting inorganic salts and a homogeneously blended mixture of formaldehyde polymers of which 10% to 90% is paraformaldehyde and the remainder is trioxane.

2. An air-deodorizing composition in the form of a solid form-stable mass containing from 0.1% to 10.0% of a formaldehyde-polymer depolymerizing catalyst selected from the group consisting of inorganic acids and acid-reacting inorganic salts, and a homogeneously blended mixture of formaldehyde polymers of which 10% to 90% is paraformaldehyde and the remainder is trioxane.

3. An air-deodorizing composition in the form of a solid form-stable mass containing a formaldehyde-polymer depolymerizing catalyst selected from the group consisting of inorganic acids and acid-reacting inorganic salts, a perfuming agent and a homogeneously blended mixture of formaldehyde polymers of which 10% to 90% is paraformaldehyde and the remainder is trioxane.

4. An air-deodorizing composition in the form of a solid form-stable mass containing a formaldehyde-polymer depolymerizing catalyst selected from the group consisting of inorganic acids and acid-reacting inorganic salts, a homogeneously blended mixture of formaldehyde polymers of which 10% to 90% is paraformaldehyde and the remainder is trioxane, and a solid diluent compatible with the formaldehyde polymer mixture and having a sufficiently high vapor pressure at room temperature to sublime spontaneously.

5. An air-deodorizing composition in the form of a solid form-stable mass containing homogeneously blended about 1 part by weight of trioxane, from about 1 to about 3 parts by weight of paraformaldehyde, and minor amounts of a formaldehyde-polymer depolymerizing agent selected from the group consisting of inorganic acids and acid-reacting inorganic salts and a perfuming agent.

6. An air-deodorizing composition in the form of a solid form-stable mass containing homogeneously blended about 117.5 parts by weight of trioxane, about 352.5 parts by weight of paraformaldehyde, about 5 parts by weight of 10% hydrochloric acid and about 25 parts by weight of a perfuming agent.

7. An air-deodorizing composition in the form of a solid form-stable mass containing homogeneously blended about 235 parts by weight of trioxane, about 235 parts by weight of paraformaldehyde, about 5 parts by weight of zinc chloride dissolved in about 5 parts by weight of water and about 20 parts by weight of a perfuming agent.

8. An air-deodorizing composition in the form of a solid form-stable mass containing homogeneously blended about 117.5 parts by weight of trioxane, about 235 parts by weight of para-dichlorbenzene, about 117.5 parts by weight of paraformaldehyde, about 10 parts by weight of a 50% aqueous phosphoric acid solution and about 20 parts by weight of a perfuming agent.

9. The method of producing an air-deodorizing composition in the form of a solid form-stable mass, which comprises: melting trioxane and, while maintaining it at a temperature above its melting point and below its boiling point, which temperature is below the decomposition point of paraformaldehyde, homogeneously incorporating with the trioxane an amount of paraformaldehyde in the range from one-ninth of to nine times the weight of the trioxane, dispersing in the melt from 0.1% to 10% by weight of a depolymerizing agent selected from the group consisting of inorganic acids and acid-reacting inorganic salts, filling the completed mixture into a mold while at a temperature at which it has a plastic-to-fluid consistency, and cooling the mixture in the mold, whereby a solid form-stable mass is obtained.

10. The process defined in claim 9, in which the temperature at which the trioxane is maintained during admixture of paraformaldehyde is substantially in the range 70°–80° C.

JONAS KAMLET.

REFERENCES CITED

The following references are of record in the file of this patent:

UNITED STATES PATENTS

| Number | Name | Date |
| --- | --- | --- |
| Re. 12,084 | Blackmore | Feb. 24, 1903 |
| 730,231 | Busch | June 9, 1903 |
| 2,081,236 | Hinegardner | May 25, 1937 |
| 2,125,375 | Hinegardner | Aug. 2, 1938 |
| 2,304,080 | Frank | Dec. 8, 1942 |

FOREIGN PATENTS

| Number | Country | Date |
| --- | --- | --- |
| 581,603 | Germany | June 7, 1932 |
| 27,572 | Great Britain | 1907 |

OTHER REFERENCES

Chem. Eng. News, vol. 21, (1943), pages 1250–1251.